Patented July 8, 1924.

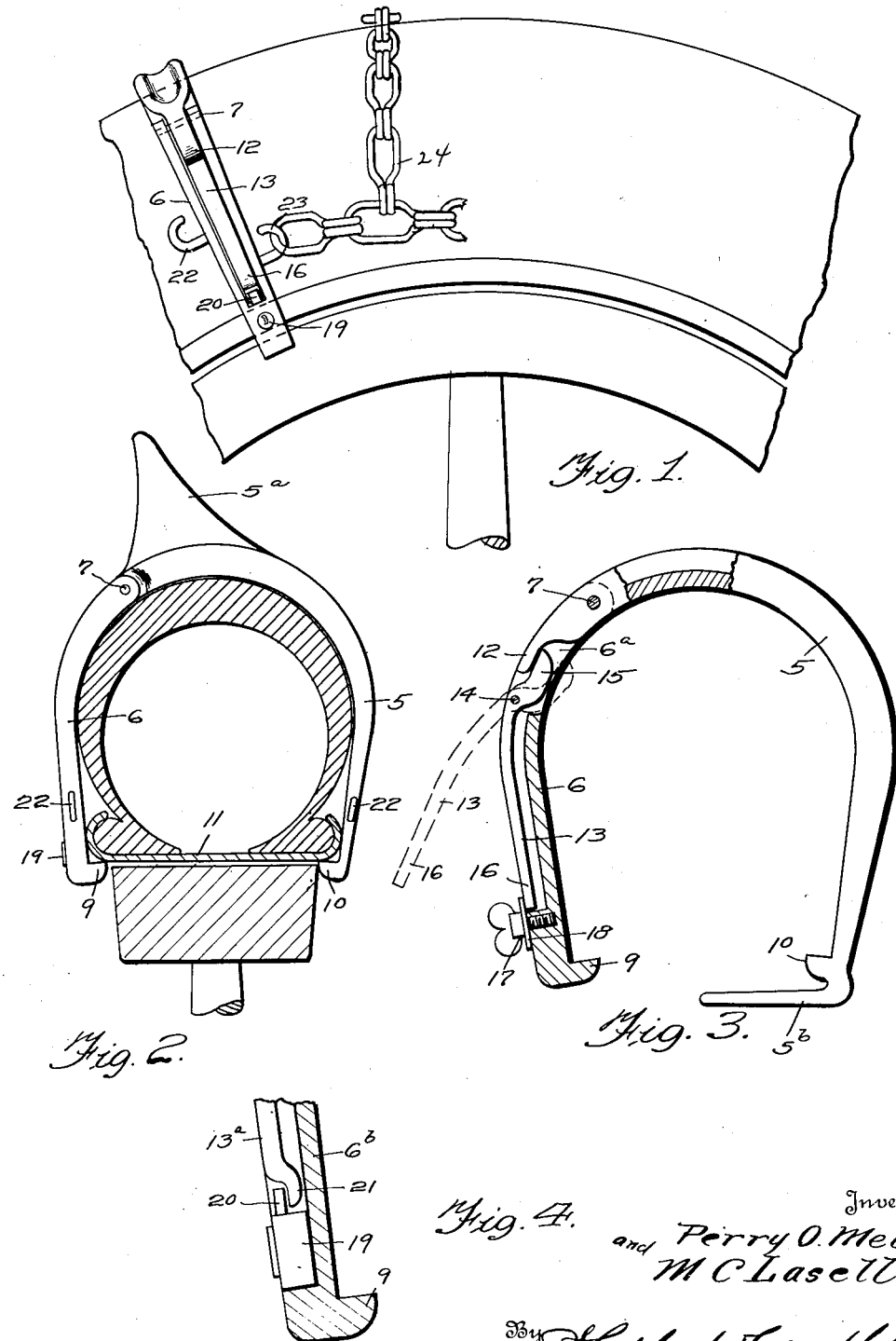

1,500,409

UNITED STATES PATENT OFFICE.

PERRY O. MELTON AND M. C. LASELL, OF ABERDEEN, SOUTH DAKOTA.

ATTACHMENT FOR AUTOMOBILE WHEELS.

Application filed January 23, 1923. Serial No. 614,442.

*To all whom it may concern:*

Be it known that we, PERRY O. MELTON and M. C. LASELL, citizens of the United States, residing at Aberdeen, in the county of Brown and State of South Dakota, have invented certain new and useful Improvements in Attachments for Automobile Wheels, of which the following is a specification, reference being had therein to the accompanying drawings.

This invention relates to an attachment for automobile wheels and has for its object to provide a device adapted to be easily and quickly clamped in position upon an automobile tire and constructed in such manner as to serve a number of useful purposes.

One of the purposes served by the device of the present invention is to provide means for increasing the tractive effect of the wheel in mud or snow and particularly in the former.

A further object of the invention is to provide a device of the character described adapted to serve as a theft preventing medium.

The device of this invention is useful in securing structures of various kinds upon an automobile tire. It is only necessary to shape the body portion of the device in a manner to adapt it for the particular service desired. If, for example, it be desired to provide a theft prevention device, the body portion of the clamping structure may be provided with a horn or projection which will cause a bumping action of the wheel, if an unauthorized person tries to drive an automobile equipped with the device, without removing the same. If, upon the other hand, it is desired to use the device for traction purposes the body portion will be suitably shaped to effect that end.

It is a further object of the invention to provide a device of the character indicated of such a nature that it will serve to apply a non-skid chain to the tire even though the wheel be down to the hub in the mud It is a further object of the invention to provide a device of the character indicated which may be locked in position upon the tire and which will engage the rim of the wheel in such manner that it cannot be removed even though the tire be deflated.

A further and particular object of the invention is to provide a device of the character indicated adapted for use in conjunction with disc wheels.

Further objects and advantages of the invention will be set forth in the detailed description which follows.

In the accompanying drawing:

Fig. 1 is a view illustrating a portion of an automobile wheel and tire with one of the devices applied thereto;

Fig. 2 is a sectional view through the tire showing the device of the invention in side elevation and showing a form of the invention adapted for use as a theft preventer;

Fig. 3 is a view partly in side elevation and partly in section illustrating the manner of operation of the locking tongue; and Fig. 4 is a modified view showing a lock for holding the locking tongue in locked position in lieu of the thumb bolt illustrated in Fig. 3.

Like numerals designate corresponding parts in all of the figures of the drawing.

The body portion of the device comprises the two parts 5 and 6, the part 6 being hinged to the part 5 at 7 and the two parts complementally forming a structure of substantially horseshoe shape and having the inturned extremities 9 and 10 which are adapted to engage beneath the outer portions of the rim 11 of the wheel. When thus engaged, it is not possible to remove the device and this structure lends itself equally as well to application to a disc wheel, as to a wheel having spokes. When used upon disc wheels the part 5 may be provided with an extension 5$^b$ which positively prevents the removal of the device from the wheel until unlocked.

In the form of the invention illustrated in Fig. 2, the body portion 5 is provided with a horn. 5$^a$ which adapts the device to serve as a theft preventing medium in a manner that will be readily understood. The extremity of the body portion 5 is provided with a lip 12 which lies between the spaced sides 6$^a$ of the member 6. A locking tongue 13 is pivoted at 14 between these spaced sides and has a nose 15 which is adapted to engage beneath the lip 12 as presently set forth. The tail 16 of the locking tongue may be held against outward movement with respect to the member 6 by any suitable locking structure. In Figure 3 of the drawing we have illustrated an ordinary thumb bolt 17, a flange 18 of which serves this purpose and it is manifest that when this tail is held in substantial alignment with the member 6 by said thumb bolt 17, the members 5 and 6 will be locked against movement away from each other. If the tail be released by the removal of the bolt 17 or other locking elements, the locking tongue may be swung to the dotted line position illustrated in Figure 3 and then the member 6 may be opened with respect to the member 5 by movement upon the pivot 7 and in this open position may be readily slipped over the largest part of the tire, in the application of the device.

In Fig. 4 we have illustrated a modified form of the invention wherein the member 6$^b$ carries a suitable lock 19, the bolt 20 of which is adapted to move in front of the depending end 21 of the locking tongue 13$^a$. It will be readily understood that any suitable form of lock may be employed whether it be a key controlled lock, combination lock or simple spring actuated latch.

Hooks 22 and 23 provide points of attachment for connecting chains 24 thereto. These may be the ordinary non-skid chains, such as the "Weed" chain or the like. By the use of this invention such chains may be applied to a wheel without jacking up the wheel even though the automobile be sunk to its hubs in a mud hole. This is accomplished by engaging one end of the non-skid chain with hooks 23, for example, and then causing the wheel to turn by means of the automobile engine. This carries the chain around through the mud until its hooked ends come to the top of the wheel again. The opposed ends of the chains are then engaged with each other in the usual way after the device of the present invention has been removed. However, these devices are intended for use without the employment of any chains whatever when desired. By providing the hooks 22 and 23 on opposite sides of the device it may be used on both the right and left wheels.

Attention is directed to the fact that the point of hinging of the member 5 with respect to the member 6 is such that this hinge is brought to one side of the center line of the structure so that it is not subjected to wear at the tread portion of the tire, while at the same time it is located at such a point that when the member 6 is opened out with respect to the member 5, a large throat is provided through which the body of the tire may be passed in the application of the device.

Furthermore it will be observed that the hinge is brought to the outside of the wheel where the operator can get at it and the locking mechanism is brought to a point where it will be most accessible to the operator and be protected from injury and liability of damage.

There are many theft prevention, and non-skid devices on the market constructed in such manner that they must pass entirely through the wheel between the spokes. Such devices cannot be used on the disc wheels which are coming so rapidly into use. The device of the present invention is of such a nature as to be adapted for use on disc wheels as well as on spoke wheels.

It is to be understood that the invention is not limited to the precise construction set forth but that it includes within its purview whatever changes fairly come within either the terms or the spirit of the appended claims.

Having described our invention, what we claim is:

1. A device of the character described of general horseshoe shape having inturned terminal ends and comprising a pair of sections hingedly connected to each other, one of said sections being shorter than the other to bring the point of hinging to one side of the center line of the device.

2. A device of the character described of general horseshoe shape having inturned ends and made in two sections hingedly connected to each other, a locking tongue carried by one of said sections and comprising a nose adapted to engage beneath an overhanging part upon the other of said sections and a tail portion and means for holding said tail portion against outward movement.

3. A structure as recited in claim 2 wherein said holding means comprises a lock having a bolt movable to and from a position in front of said tail.

4. A structure as recited in claim 1 in combination with a horn or projection upon one of said members.

5. A structure as recited in claim 1 in combination with hooks projecting from the opposite sides of said members and chain sections adapted to be connected with said hooks.

6. A device of the character described of general horseshoe shape having inturned projections at its inner end adapted to engage beneath the rim portion of a wheel and comprising a pair of hingedly connected members the point of hinging of which lies to one side of the center line of the structure and one of said members being longer than the other, the shorter of said members being bifurcated and embracing the terminal portion of the other of said members, said terminal portion being provided with an overhanging lip, a locking tongue pivotally mounted upon the shorter section and comprising a nose adapted to engage beneath said lip and a tail adapted to be moved into substantial alignment with the said shorter member and means for holding said tail in such aligned position.

In testimony whereof we hereunto affix our signatures.

PERRY O. MELTON.
M. C. LASELL.